(12) United States Patent
Miyake et al.

(10) Patent No.: US 6,362,129 B1
(45) Date of Patent: Mar. 26, 2002

(54) CATALYST FOR PURIFYING AN EXHAUST GAS

(75) Inventors: Yoshiharu Miyake, Susono; Shinji Tsuji, Numazu, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/531,010

(22) Filed: Mar. 20, 2000

(30) Foreign Application Priority Data

Apr. 8, 1999 (JP) .............................. 11-100831

(51) Int. Cl.⁷ .............................. B01J 23/02; B01J 23/04
(52) U.S. Cl. .................. 502/344; 502/302; 502/303; 502/304; 502/355
(58) Field of Search ................. 502/344, 302, 502/303, 304, 355; 423/593

(56) References Cited

U.S. PATENT DOCUMENTS

| | | | | |
|---|---|---|---|---|
| 3,663,181 A | * | 5/1972 | Shannon | ........ 23/315 |
| 4,134,852 A | | 1/1979 | Volin | |
| 4,264,685 A | * | 4/1981 | Carcia et al. | ........ 429/40 |
| 4,384,986 A | | 5/1983 | Lecloux et al. | |
| 5,175,135 A | * | 12/1992 | Lee et al. | ........ 502/64 |
| 5,900,519 A | * | 5/1999 | Notte et al. | ........ 585/446 |
| 5,925,590 A | | 7/1999 | White et al. | |

FOREIGN PATENT DOCUMENTS

| | | |
|---|---|---|
| JP | A-60-238148 | 11/1985 |
| JP | A-4-235742 | 8/1992 |
| JP | A-04-235742 | 8/1992 |
| JP | A-10-76159 | 3/1998 |
| JP | A-10-216518 | 8/1998 |
| WO | WO 96/14153 | 5/1996 |

* cited by examiner

*Primary Examiner*—Steven P. Griffin
*Assistant Examiner*—Edward M. Johnson
(74) *Attorney, Agent, or Firm*—Oliff & Berridge, PLC

(57) ABSTRACT

A catalyst for purifying an exhaust gas includes a composite oxide including gold (Au) and having crystalline unit cells in every one of which an Au ion is disposed. Since the Au exists in a state of an ion, the catalyst exhibits a good catalytic activity. Since the Au is present in such a manner that it is surrounded by the other elements, it is inhibited from moving. As a result, the catalyst is improved in terms of the heat resistance.

9 Claims, No Drawings

CATALYST FOR PURIFYING AN EXHAUST GAS

BACKGROUND OF THE INVENTION

1. Field of the Invention

The present invention relates to a novel catalyst for purifying an exhaust gas, catalyst which comprises Au.

2. Description of the Related Art

As an exhaust-gas-purifying catalyst for purifying an exhaust gas emitted from an automobile engine, a catalyst has been used widely which includes a porous oxide support, such as alumina, loaded with a noble metal, such as Pt, Rh and Pd. Recently, a research has been developed on a catalyst in which Au is used instead of a noble metal, such as Pt, Rh and Pd. For example, there is a catalyst, in which Au particulates are loaded on a support, such as alumina. The catalyst exhibits a good oxidizing activity for an inflammable gas. However, the catalyst has a problem in that the Au particulates exhibit low heat resistance. Hence, a variety of measures are taken in order to improve the heat resistance.

For instance, in Japanese Unexamined Patent Publication (KOKAI) No. 4-235,742, as a catalyst for decomposing aldehyde in an exhaust gas at a low temperature, there is disclosed an aldehyde-decomposing catalyst for purifying an exhaust gas, catalyst which includes: a composite oxide expressed by a chemical formula, $Ce_{1-x}Zr_xCu_{1-y}Au_yO_{3-z}$, in which "x" is 0.1 or 0.2, "y" falls in the range of from 0.02 to 0.04 and "z" is 1.0 or less; an activated alumina containing cerium; and an oxide having an oxygen storage ability.

It is therefore an object of the present invention to improve the heat resistance of Au and to inhibit the purifying performance after a durability test from decreasing by making a structure of a catalyst different from that of the catalyst disclosed in Japanese Unexamined Patent Publication (KOKAI) No. 4-235,742.

SUMMARY OF THE INVENTION

In an aspect of the present invention carrying out the aforementioned object, an exhaust-gas-purifying catalyst comprises: a composite oxide including gold (Au) and having crystalline unit cells in every one of which an Au ion is disposed.

In a further aspect of the present invention embodying the present exhaust-gas-purifying catalyst, an exhaust-gas-purifying catalyst comprises the composite oxide including at least one metal "M" selected from the group consisting of alkaline-earth metals and expressed by a chemical formula, $Au_2M_5O_8$.

In a further aspect of the present invention embodying the present exhaust-gas-purifying catalyst, an exhaust-gas-purifying catalyst comprises the composite oxide including at least one metal "X" selected from the group consisting of rare-earth elements, at least one metal "Y" selected from the group consisting of alkali metals, and expressed by a chemical formula, $X_2Au_{0.5}Y_{0.5}O_4$.

The exhaust-gas-purifying catalyst of the present invention is good in terms of the durability of the catalytic activity of Au, and can maintain high purifying performance from an initial stage to a final stage after a durability test.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

The present exhaust-gas-purifying catalyst comprises the composite oxide which includes Au, and has crystalline unit cells in every one of which an Au ion is disposed. Namely, since the Au exists in a state of the ions, the present exhaust-gas-purifying catalyst exhibits a good catalytic activity. Further, this exhaust-gas-purifying catalyst is extremely superb in terms of the heat resistance. It is believed that these advantages result from the arrangement that the Au is present in such a manner that it is surrounded by the other elements, and that it is accordingly inhibited from moving.

Note that, in the conventional catalyst expressed by the chemical formula, $Ce_{1-x}Zr_xCu_{1-y}Au_yO_{3-z}$, in which "w" is 0.1 or 0.2, "y" falls in the range of from 0.02 to 0.04 and "z" is 1.0 or less, the Au content is so insufficient that the Au ion is not disposed in every one of the crystalline unit cells. Thus, the conventional catalyst is structurally different from the present exhaust-gas-purifying catalyst, and operates differently from the present exhaust-gas-purifying catalyst in which the Au mainly purifies an exhaust gas.

In the aforementioned present exhaust-gas-purifying catalyst, it is possible to composite a variety of metals as a metallic element other than the Au. However, due to the production reasons, it is preferred that a metal is selected from the group consisting of alkaline-earth metals, the group consisting of alkali metal or the group consisting of rare-earth elements. For example, when an alkaline-earth metal (M) is composited in the composite oxide, the structure, which is turned into the crystal including an Au ion in every one of the crystalline unit cells, is expressed by a chemical formula, $Au_2M_5O_8$.

Further, it is possible to composite a plurality of metals other than the Au. For instance, when both of a rare-earth element (X) and an alkali metal (Y) are composited in the composite oxide, the structure, which is turned into the crystal including an Au ion in every one of the crystalline unit cells, is expressed by a chemical formula, $X_2Au_{0.5}Y_{0.5}O_4$.

It is possible to composite an alkaline-earth metal doped with an alkali metal or a rare-earth element. It is also possible to composite a rare-earth element doped with an alkali metal or an alkaline-earth metal. It is further possible to composite an alkali metal doped with an alkaline-earth metal or a rare-earth element.

As for the alkaline-earth metal, which is used preferably in the present exhaust-gas-purifying catalyst, Be, Mg, Ca, Sr and Ba can be exemplified, and it is possible to composite at least one of these elements. Among them, Sr and Ba are especially preferred. As for the rare-earth element, it is preferable to use at least one member selected from the group consisting of La, Ce and Nd. As for the alkali metal, it is preferable to use at least one member selected from the group consisting of Li, Na, K, Rb and Cs.

In the present exhaust-gas-purifying catalyst, it is, of course, possible to composite only Au. It is also possible to composite Au doped with a noble metal, such as Pt, Pd and Ag.

The present exhaust-gas-purifying catalyst can be used by loading it on a porous oxide, such as activated alumina, alumina, zirconia, silica and titania. The present exhaust-gas-purifying catalyst can be produced by mixing the powders of the aforementioned metals or metallic compounds in a solid phase and burning them. Alternatively, oxide precursors can be precipitated from a mixture solution including the aforementioned metals by the co-precipitation method or the sol-gel process, and they can be burned to make a composite oxide.

Hereinafter, the present invention will be described in detail with reference to examples and comparative examples.

EXAMPLE NO. 1

4.1 g (0.01 mol) of an $HAuCl_4 \cdot 4H_2O$ powder and 5.4 g (0.025 mol) of an $Sr(CH_3COO)_2 \cdot 1/2H_2O$ powder were mixed uniformly in a solid phase by using a ball mill. The mixture was calcined in air at 300° C. for 3 hours. The resulting precursor was pulverized uniformly, and was thereafter burned in air at 1,000° C. for 50 hours, thereby preparing a composite oxide powder whose composition was $Au_2Sr_5O_8$. According to the XRD analysis, the resulting powder was found to be a composite oxide.

According to the x-ray diffraction, the crystalline structure of this composite oxide was found to be the type F222. Therefore, in this composite oxide, an Au ion was included in every one of the crystalline unit cells.

1 part by weight of the resulting composite oxide powder and 99 parts by weight of a $\gamma$-$Al_2O_3$ powder were mixed by using a ball mill, thereby making a catalyst of Example No. 1. The content of Au in the catalyst was 0.4% by weight.

EXAMPLE NO. 2

2.8 g (0.01 mol) of an AuSr alloy powder and 4.0 g (0.015 mol) of an $Sr(CH_3COO)_2 \cdot 1/2H_2O$ powder were mixed uniformly in a solid phase by using a ball mill. The mixture was burned in air at 650° C. for 100 hours, thereby preparing a composite oxide powder whose composition was $Au_2Sr_5O_8$. According to the XRD analysis, the resulting powder was found to be a composite oxide.

According to the x-ray diffraction, the crystalline structure of this composite oxide was found to be the type F222. Therefore, in this composite oxide, an Au ion was included in every one of the crystalline unit cells.

1 part by weight of the resulting composite oxide powder and 99 parts by weight of a $\gamma$-$Al_2O_3$ powder were mixed by using a ball mill, thereby making a catalyst of Example No. 2. The content of Au in the catalyst was 0.4% by weight.

EXAMPLE NO. 3

4.1 g (0.01 mol) of an $HAuCl_4 \cdot 4H_2O$ powder, 0.7 g (0.01 mol) of an $LiCH_3COO$ powder, and 13.7 g (0.04 mol) of an $La(CH_3COO)_3 \cdot 3/2H_2O$ powder were mixed uniformly in a solid phase by using a ball mill. The mixture was calcined in air at 300° C. for 6 hours. The resulting precursor was pulverized uniformly, and was thereafter burned in air at 750° C. for 30 hours, thereby preparing a composite oxide powder whose composition was $La_2Au_{0.5}Li_{0.5}O_4$. According to the XRD analysis, the resulting powder was found to be a composite oxide.

According to the x-ray diffraction, the crystalline structure of this composite oxide was found to be the type Cmmm. Therefore, in this composite oxide, an Au ion was included in every one of the crystalline unit cells.

10 parts by weight of the resulting composite oxide powder and 90 parts by weight of a $\gamma$-$Al_2O_3$ powder were mixed by using a ball mill, thereby making a catalyst of Example No. 3. The content of Au in the catalyst was 0.2% by weight.

EXAMPLE NO. 4

4.1 g (0.01 mol) of an $HAUCl_4 \cdot 4H_2O$ powder, 0.4 g (0.01 mol) of an $LiOH \cdot H_2$ powder, and 6.5 g (0.02 mol) of an $La_2O_3$ powder were mixed uniformly in a solid phase by using a ball mill. The mixture was calcined in air at 300° C. for 6 hours. The resulting precursor was pulverized uniformly, and was thereafter burned in air at 750° C. for 30 hours, thereby preparing a composite oxide powder whose composition was $La_2Au_{0.5}Li_{0.5}O_4$. According to the XRD analysis, the resulting powder was found to be a composite oxide.

According to the x-ray diffraction, the crystalline structure of this composite oxide was found to be the type Cmmm. Therefore, in this composite oxide, an Au ion was included in every one of the crystalline unit cells.

10 parts by weight of the resulting composite oxide powder and 90 parts by weight of a $\gamma$-$Al_2O_3$ powder were mixed by using a ball mill, thereby making a catalyst of Example No. 4. The content of Au in the catalyst was 0.2% by weight.

Comparative Example No. 1

Ion exchanged water was prepared, included a $\gamma$-$Al_2O_3$ powder in an amount of 0.51% by weight, and exhibited a temperature of 60° C. Into the ion exchanged water, the following were solved so that an $HAuCl_4 \cdot 4H_2O$ powder was solved in an amount of 0.022% by weight, $Na_2S_2O_3 \cdot 5H_2O$ was solved in an amount of 0.106% by weight, $Na_2SO_3$ was solved in an amount of 0.269% by weight, and $C_6H_7NaO_6$ was solved in an amount of 1.06% by weight. The ion exchanged water was held at 60° C., and was stirred for 24 hours, thereby reducing and precipitating Au on the $\gamma$-$Al_2O_3$ in a particulate manner. Thereafter, the ion exchanged water was filtered, and the resulting cake was washed with ion exchanged water exhibiting a temperature of 60° C. Then, the cake was dried in air at 120° C. for 2 hours, and was further heat-treated in air at 500° C. for 2 hours, thereby preparing a catalyst of Comparative Example No. 1. The content of Au in the catalyst was 2% by weight.

<Test and Evaluation>

Each of the resulting catalysts was pelletized by an ordinary method, and was disposed in a testing and evaluation apparatus in a predetermined amount. Then, an evaluation model gas as set forth in Table 1 below was flowed at a space velocity of 150,000 $hr^{-1}$. Then, the conversions of $C_3H_6$ were measured substantially continuously while decreasing the inlet gas temperature from 500° C. to 100° C. by a temperature decrement rate of 10° C./minute. Note that the conversions were calculated by the following equation:

Conversion=100×{($C_3H_6$ Concentration in Inlet Gas)−($C_3H_6$ Concentration in Outlet Gas)}/($C_3H_6$ Concentration in Inlet Gas)

From the resulting data, 50% conversion temperatures of $C_3H_6$ were determined, and the results are set forth in Table 2 below as initial values.

Subsequently, a durability test was carried out, in which a durability model gas as set forth in Table 1 below was flowed in each of the pelletized catalysts at an inlet gas temperature of 800° C. for 5 hours. Then, on each of the pelletized catalysts subjected to the durability test, the conversions of $C_3H_6$ were measured in the aforementioned manner, and the results are set forth in Table 2 below as after-durability-test values.

TABLE 1

| | CO (ppm) | $C_3H_6$ (ppmC) | NO (ppm) | $O_2$ (%) | $CO_2$ (%) | $H_2O$ (%) | $N_2$ |
|---|---|---|---|---|---|---|---|
| For Evaluation | 1000 | 670 | 250 | 7.3 | 6.7 | 5 | Balance |
| For Durability | 1000 | 670 | 500 | 6.5 | 10 | 10 | Balance |

TABLE 2

| Catalyst Composition | | Temp. at 50% Conversion | |
|---|---|---|---|
| Chemical Formula | Au Content (% by Weight) | Initial (° C.) | After Durability Test (° C.) |
| Ex. #1 $Au_2Sr_5O_8$ | 0.4 | 345 | 346 |
| Ex. #2 $Au_2Sr_5O_8$ | 0.4 | 340 | 355 |
| Ex. #3 $La_2Au_{0.5}Li_{0.5}O_4$ | 0.2 | 341 | 348 |
| Ex. #4 $La_2Au_{0.5}Li_{0.5}O_4$ | 0.2 | 344 | 345 |
| C.E. #1 $Au/\gamma\text{-}Al_2O_3$ | 2.0 | 378 | 433 |

The following are apparent from Table 2. Although the Au contents of the catalysts of the examples were smaller than that of Comparative Example No. 1, the catalysts of the examples were good in terms of the initial purifying performance, and were hardly degraded in terms of the conversion after the durability test. On the other hand, the catalyst of Comparative Example No. 1 was not only inferior to the catalysts of the examples in terms of the initial purifying performance, but also the purifying performance was deteriorated sharply after the durability test.

Namely, the catalysts of the examples exhibited high purifying performance initially and even after the durability test. It is apparent that this advantage resulted from the arrangement that the composite oxides had the compositions recited in the claims.

Having now fully described the present invention, it will be apparent to one of ordinary skill in the art that many changes and modifications can be made thereto without departing from the spirit or scope of the present invention as set forth herein including the appended claims.

What is claimed is:

1. A catalyst for purifying an exhaust gas, comprising:
a composite oxide including gold (Au) and having crystalline unit cells in every one of which an Au ion is disposed.

2. The catalyst according to claim 1 comprising the composite oxide including at least one metal "M" selected from the group consisting of alkaline-earth metals and expressed by a chemical formula, $Au_2M_5O_8$.

3. The catalyst according to claim 2, wherein the metal "M" is at least one member selected from the group consisting of Be, Mg, Ca, Sr and Ba.

4. The catalyst according to claim 3, wherein the metal "M" is at least one member selected from the group consisting of Sr and Ba.

5. The catalyst according to claim 1 comprising the composite oxide including at least one metal "X" selected from the group consisting of rare-earth elements, at least one metal "Y" selected from the group consisting of alkali metals, and expressed by a chemical formula, $X_2Au_{0.5}Y_{0.5}O_4$.

6. The catalyst according to claim 5, wherein the metal "X" is at least one member selected from the group consisting of La, Ce and Nd, and the metal "Y" is at least one member selected from the group consisting of Li, Na, K, Rb and Cs.

7. The catalyst according to claim 1, wherein the composite oxide is a type F222 or a type Cmmm.

8. A catalyst for purifying an exhaust gas, comprising a composite oxide including gold (Au) and having crystalline unit cells in every one of which an Au ion is disposed wherein the composite oxide includes at least one metal "M" selected from the group consisting of alkaline-earth metals, and expressed by a chemical formula, $Au_2M_5O_8$.

9. A catalyst for purifying an exhaust gas, comprising a composite oxide including gold (Au) and having crystalline unit cells in every one of which an Au ion is disposed, wherein the composite oxide includes at least one metal "X" selected from the group consisting of rare-earth elements, at least one metal "Y" selected from the group consisting of alkali metals, and expressed by a chemical formula, $X_2Au_{0.5}Y_{0.5}O_4$.

* * * * *